US012581458B2

(12) United States Patent
Toskala et al.

(10) Patent No.: US 12,581,458 B2
(45) Date of Patent: Mar. 17, 2026

(54) ENERGY EFFICIENT PAGING PROCEDURE FOR DUAL-MODE USER EQUIPMENT

(71) Applicant: Nokia Technologies Oy, Espoo (FI)

(72) Inventors: Antti Anton Toskala, Espoo (FI); Luis Guilherme Uzeda Garcia, Massy (FR); Srinivasan Selvaganapathy, Bangalore (IN); Jussi-Pekka Koskinen, Oulu (FI); Samuli Heikki Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 449 days.

(21) Appl. No.: 18/042,630

(22) PCT Filed: Aug. 31, 2021

(86) PCT No.: PCT/EP2021/073921
§ 371 (c)(1),
(2) Date: Feb. 23, 2023

(87) PCT Pub. No.: WO2022/053347
PCT Pub. Date: Mar. 17, 2022

(65) Prior Publication Data
US 2023/0337186 A1     Oct. 19, 2023

(30) Foreign Application Priority Data
Sep. 9, 2020     (IN) .............................. 202041038944

(51) Int. Cl.
*H04W 68/12* (2009.01)
*H04W 68/02* (2009.01)
(52) U.S. Cl.
CPC ........... *H04W 68/12* (2013.01); *H04W 68/02* (2013.01)

(58) Field of Classification Search
None
See application file for complete search history.

(56) References Cited

U.S. PATENT DOCUMENTS 9,642,043 B1 * 5/2017 Drailing .......... H04W 36/00224
10,334,485 B2 6/2019 Chandramouli et al.
(Continued)

FOREIGN PATENT DOCUMENTS

EP        3278597 A1     2/2018
EP        3522627 A2     8/2019
(Continued)

OTHER PUBLICATIONS

Decision of Rejection received for corresponding Japanese Patent Application No. 2023-515715, dated Nov. 19, 2024, 4 pages of Decision of Rejection and 4 pages of summary/translation available.
(Continued)

*Primary Examiner* — Frantz Bataille
(74) *Attorney, Agent, or Firm* — Lippes Mathias LLP

(57) ABSTRACT

Various example embodiments relate to energy efficient paging of dual-mode user equipment (UE). A UE may receive paging configuration information from a first network. The paging configuration information may comprise paging parameter(s) for monitoring a paging channel of a second network. Based on the received paging configuration information, the UE may monitor the paging channel of the second network and receive a paging message associated with the first network from the second network. In response to receiving the paging message from the second network, the UE may transmit a paging response to the first network. Apparatuses, methods, and computer programs are disclosed.

17 Claims, 8 Drawing Sheets

(56) References Cited

U.S. PATENT DOCUMENTS

| | | | |
|---|---|---|---|
| 2016/0057723 A1 | 2/2016 | Horn et al. | |
| 2016/0198400 A1 | 7/2016 | Cho et al. | |
| 2017/0041900 A1 | 2/2017 | Wallentin et al. | |
| 2017/0086166 A1 | 3/2017 | Kasilya Sudarsan et al. | |
| 2018/0317198 A1 | 11/2018 | Lee et al. | |
| 2019/0069150 A1 | 2/2019 | Blankenship et al. | |
| 2019/0069205 A1 | 2/2019 | Lee et al. | |
| 2019/0132900 A1 | 5/2019 | Hong et al. | |
| 2019/0166576 A1 | 5/2019 | Kim et al. | |
| 2019/0174571 A1 | 6/2019 | Deenoo et al. | |
| 2019/0182884 A1 | 6/2019 | Deenoo et al. | |
| 2020/0029302 A1 | 1/2020 | Cox et al. | |
| 2020/0059945 A1 | 2/2020 | Park et al. | |
| 2020/0068647 A1 | 2/2020 | Jha et al. | |
| 2020/0154516 A1 | 5/2020 | Gambhir-Parekh | |
| 2020/0169982 A1 | 5/2020 | Höglund | |
| 2021/0250828 A1* | 8/2021 | Vaidya | H04W 24/08 |

FOREIGN PATENT DOCUMENTS

| | | |
|---|---|---|
| JP | 2009-088980 A | 4/2009 |
| JP | 2011-061456 A | 3/2011 |
| WO | 2010/019364 A1 | 2/2010 |
| WO | 2010/117761 A1 | 10/2010 |
| WO | 2016/159643 A1 | 10/2016 |
| WO | 2018/030826 A1 | 2/2018 |
| WO | 2018/144936 A1 | 8/2018 |
| WO | 2019/158017 A1 | 8/2019 |
| WO | 2019/162025 A1 | 8/2019 |

OTHER PUBLICATIONS

Office action received for corresponding European Patent Application No. 21769965.1, dated Nov. 25, 2024, 7 pages.
"Rel-17 Power Saving Enhancements", 3GPP TSG RAN#85, RP-192069, Agenda item: 8.1.8, MediaTek Inc., Sep. 16-20, 2019, 14 pages.
"New SID on support of reduced capability NR devices", 3GPP TSG RAN Meeting #86, RP-193238, Agenda item: 9.1.1, Ericsson, Dec. 9-12, 2019, 5 pages.
"Evaluation of fast SCell access in NR", 3GPP TSG-RAN WG2 #105, R2-1900520, Agenda item: 11.10.2, Nokia, Feb. 24-Mar. 1, 2019, 11 pages.

"Details of paging enhancements and Light Connection", 3GPP TSG-RAN WG2 #94, R2-164047, Agenda item: 8.9.1, Kyocera, May 23-27, 2016, 5 pages.
"IEEE 802.11", Wikipedia, Retrieved on Mar. 4, 2023, Webpage available at : https://en.wikipedia.org/wiki/IEEE_802.11.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.
"3rd Generation Partnership Project; Technical Specification Group Radio Access Network; Evolved Universal Terrestrial Radio Access (E-UTRA); User Equipment (UE) procedures in idle mode (Release 16)", 3GPP TS 36.304, V16.0.0, Mar. 2020, pp. 1-58.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"3rd Generation Partnership Project; Technical Specification Group Radio Access Network; NR; User Equipment (UE) procedures in Idle mode and RRC Inactive state (Release 16)", 3GPP TS 38.304, V16.0.0, Mar. 2020, pp. 1-38.
"3rd Generation Partnership Project; Technical Specification Group Radio Access Network; NR; User Equipment (UE) radio access capabilities (Release 16)", 3GPP TS 38.306, V16.0.0, Mar. 2020, pp. 1-64.
"Msc-generator", Sourceforge, Retrieved on Mar. 4, 2023, Webpage available at : https://sourceforge.net/projects/msc-generator/.
Alsaeedy et al., "Mobility Management for 5G IoT Devices: Improving Power Consumption With Lightweight Signaling Overhead", IEEE Internet of Things Journal, vol. 6, No. 5, Oct. 2019, pp. 8237-8247.
International Search Report and Written Opinion received for corresponding Patent Cooperation Treaty Application No. PCT/EP2020/053720, dated Nov. 9, 2020, 10 pages.
International Search Report and Written Opinion received for corresponding Patent Cooperation Treaty Application No. PCT/EP2021/073921, dated Dec. 2, 2021, 12 pages.
Office Action received for corresponding Japanese Patent Application No. 2023-515715, dated Jun. 27, 2024, 5 pages of Office Action and 10 pages of summary and translation available.
"Multiple POs for Paging in NR-U", 3GPP TSG-RAN2 105, R2-1900135, Agenda item: 11.2.2.1, Samsung, Feb. 25-Mar. 1, 2019, 3 pages.

* cited by examiner

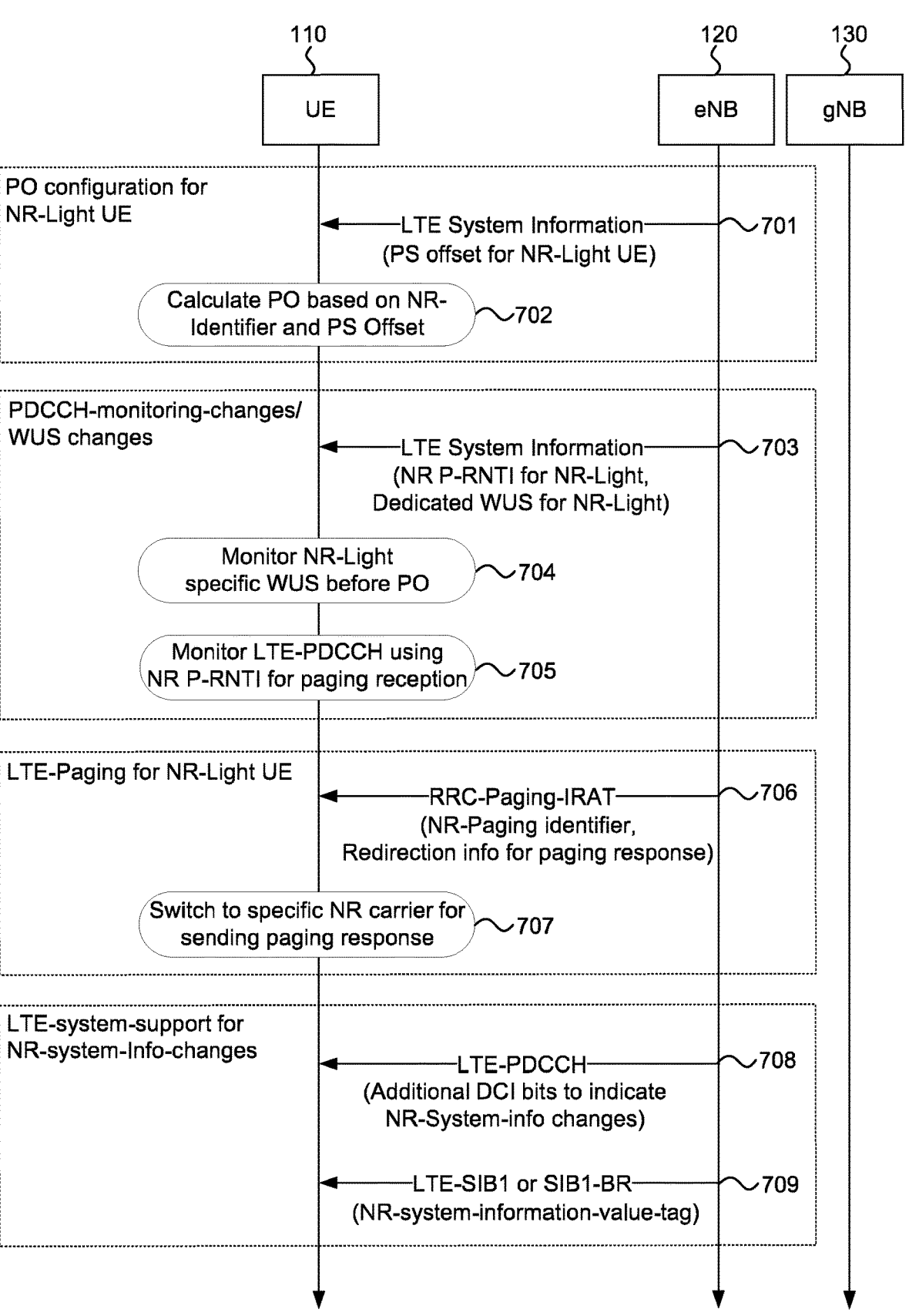

110                                          120         130

UE                                           eNB         gNB

PO configuration for
NR-Light UE

◄────────LTE System Information────────∿701
(PS offset for NR-Light UE)

( Calculate PO based on NR-
Identifier and PS Offset )∿702

PDCCH-monitoring-changes/
WUS changes

◄────────LTE System Information────────∿703
(NR P-RNTI for NR-Light,
Dedicated WUS for NR-Light)

( Monitor NR-Light
specific WUS before PO )∿704

( Monitor LTE-PDCCH using
NR P-RNTI for paging reception )∿705

LTE-Paging for NR-Light UE

◄────────RRC-Paging-IRAT────────∿706
(NR-Paging identifier,
Redirection info for paging response)

( Switch to specific NR carrier for
sending paging response )∿707

LTE-system-support for
NR-system-Info-changes

◄────────LTE-PDCCH────────∿708
(Additional DCI bits to indicate
NR-System-info changes)

◄────────LTE-SIB1 or SIB1-BR────────∿709
(NR-system-information-value-tag)

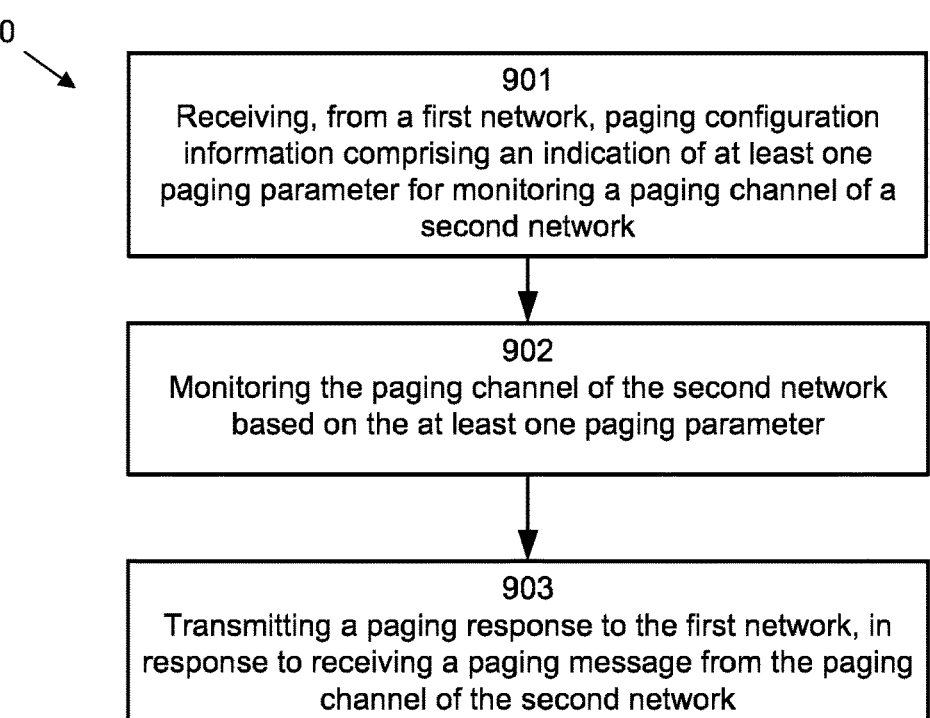

901
Receiving, from a first network, paging configuration information comprising an indication of at least one paging parameter for monitoring a paging channel of a second network

902
Monitoring the paging channel of the second network based on the at least one paging parameter

903
Transmitting a paging response to the first network, in response to receiving a paging message from the paging channel of the second network

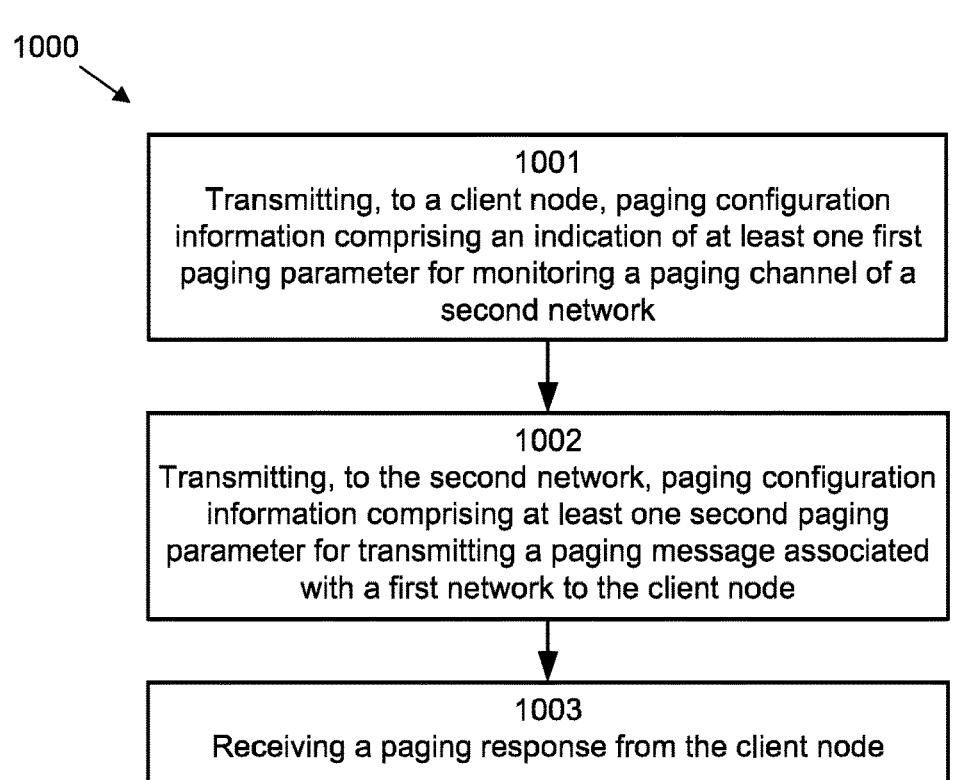

1001
Transmitting, to a client node, paging configuration information comprising an indication of at least one first paging parameter for monitoring a paging channel of a second network

1002
Transmitting, to the second network, paging configuration information comprising at least one second paging parameter for transmitting a paging message associated with a first network to the client node

1003
Receiving a paging response from the client node

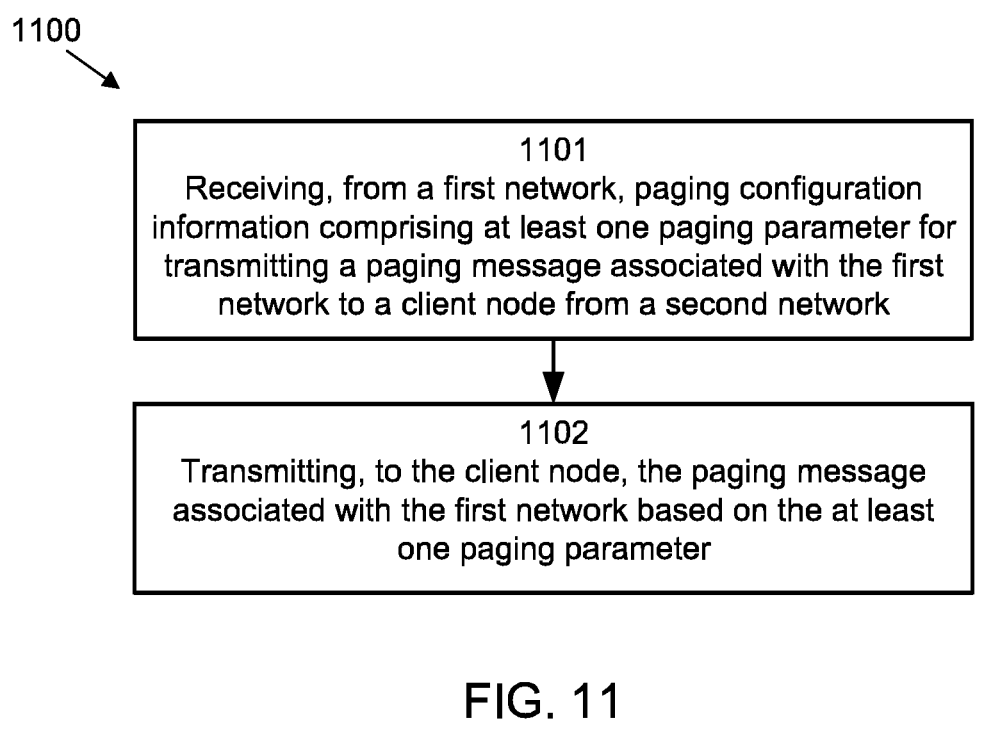

> 1101
> Receiving, from a first network, paging configuration information comprising at least one paging parameter for transmitting a paging message associated with the first network to a client node from a second network > 1102
> Transmitting, to the client node, the paging message associated with the first network based on the at least one paging parameter

FIG. 11

ENERGY EFFICIENT PAGING PROCEDURE FOR DUAL-MODE USER EQUIPMENT

RELATED APPLICATION

This application claims priority to PCT Application No. PCT/EP2021/073921, filed on Aug. 31, 2021, which claims priority from IN application No. 202041038944, filed on Sep. 9, 2020, each of which is incorporated herein by reference in its entirety.

TECHNICAL FIELD

Various example embodiments generally relate to the field of wireless communications. In particular, some example embodiments relate to paging a dual-mode user equipment in a cellular communication network.

BACKGROUND

User equipment (UE), such as for example a mobile phone, may be configured with multiple radios for communicating with base stations or access points according to different standards, or profiles thereof, for example 3GPP 5G New Radio (NR), 3GPP LTE (Long Term Evolution), 3GPP LTE-MTC or LTE-M (LTE Machine Type Communications), or 3GPP NB-IoT (Narrowband Internet of Things).

Different radios may be associated with different power consumption characteristics and in some applications it may be desired to reduce power consumption while still enabling sufficient communication capability.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide methods for energy efficient paging of a dual-mode user equipment. This benefit may be achieved by the features of the independent claims. Further implementation forms are provided in the dependent claims, the description, and the drawings.

According to a first aspect, an apparatus may comprise at least one processor and at least one memory including computer program code, the at least one memory and the computer code configured to, with the at least one processor, cause the apparatus at least to: receive, from a first network, paging configuration information comprising an indication of at least one paging parameter for monitoring a paging channel of a second network; monitor the paging channel of the second network based on the at least one paging parameter; and in response to receiving a paging message from the paging channel of the second network, transmit a paging response to the first network.

According to an example embodiment of the first aspect, the at least one memory and the computer code may be further configured to, with the at least one processor, cause the apparatus to: transmit, to the first network, an indication of a capability to receive paging messages associated with the first network from the second network.

According to an example embodiment of the first aspect, the indication of the capability may indicate a capability to receive paging messages from the second network in a narrowband idle mode.

According to an example embodiment of the first aspect, the at least one paging parameter may comprise at least one of a discontinuous reception cycle, an international mobile subscriber identity, or an inactive radio network temporary identifier.

According to an example embodiment of the first aspect, the paging configuration information may comprise at least one of: an indication of a fallback condition for transitioning to an idle mode with respect to the first network, an indication of a cell reselection condition for the first network, or an indication of a set of neighboring cells of the first network supporting paging over the second network.

According to an example embodiment of the first aspect, the at least one memory and the computer code may be further configured to, with the at least one processor, cause the apparatus to: perform cell reselection to a cell of the set of neighboring cells of the first network supporting paging over the second network, in response to detecting the cell reselection condition for the first network; and continue monitoring the paging channel of the second network, or initiate monitoring a second paging channel of the second network based on paging configuration information received from the reselected cell.

According to an example embodiment of the first aspect, the at least one memory and the computer code may be further configured to, with the at least one processor, cause the apparatus to: transition to the idle mode with respect to the first network, in response to detecting the fallback condition.

According to an example embodiment of the first aspect, the at least one memory and the computer code may be further configured to, with the at least one processor, cause the apparatus to: detect at least one paging response parameter in the paging configuration information or the paging message; and transmit the paging response to the first network based on the at least one paging response parameter.

According to an example embodiment of the first aspect, the at least one paging response parameter may comprise at least one of a cell identifier of the first network or a frequency of the first network.

According to an example embodiment of the first aspect, the paging configuration information may comprise a radio resource control connection release message.

According to an example embodiment of the first aspect, the at least one memory and the computer code may be further configured to, with the at least one processor, cause the apparatus to: receive, from the second network, control information comprising at least one of an indication of paging subframe offset relative to a paging subframe configured for the second network, an indication of a paging radio network temporary identifier, an identifier of a wakeup signal sequence, or an indication of a temporal location of a wake-up signal.

According to an example embodiment of the first aspect, the at least one memory and the computer code may be further configured to, with the at least one processor, cause the apparatus to: monitor the paging channel of the second network based on at least one of the paging subframe offset, the paging radio network temporary identifier, or the wake-up signal.

According to an example embodiment of the first aspect, the control information may comprise at least one of: an indication of an update of system information of the first network, a system information value tag of the first network, or a physical cell identifier and/or frequency information of a cell of the first network associated with a current cell of the second network, wherein the paging message is received from the current cell of the second network.

According to an example embodiment of the first aspect, the control information may be received in downlink control information, at least one system information block, at least one bandwidth reduced system information block, or at least narrowband system information block.

According to an example embodiment of the first aspect, the at least one memory and the computer code may be further configured to, with the at least one processor, cause the apparatus to: receive, from the first network, an indication of at least one of a time-frequency location of at least one common channel of the second network, a time-frequency location of at least one common signal of the second network, or timing information of the second network.

According to an example embodiment of the first aspect, the at least one memory and the computer code may be further configured to, with the at least one processor, cause the apparatus to: detect the paging message based on a type of the paging message and an identifier associated with the first network, wherein the type of the paging message indicates use of an identifier associated with the first network in the paging message.

According to a second aspect, a method may comprise: receiving, from a first network, paging configuration information comprising an indication of at least one paging parameter for monitoring a paging channel of a second network; monitoring the paging channel of the second network based on the at least one paging parameter; and transmitting a paging response to the first network, in response to receiving a paging message from the paging channel of the second network.

According to an example embodiment of the second aspect, the method may further comprise transmitting, to the first network, an indication of a capability to receive paging messages associated with the first network from the second network.

According to an example embodiment of the second aspect, the indication of the capability may indicate a capability to receive paging messages from the second network in a narrowband idle mode.

According to an example embodiment of the second aspect, the at least one paging parameter may comprise at least one of a discontinuous reception cycle, an international mobile subscriber identity, or an inactive radio network temporary identifier.

According to an example embodiment of the second aspect, the paging configuration information may comprise at least one of: an indication of a fallback condition for transitioning to an idle mode with respect to the first network, an indication of a cell reselection condition for the first network, or an indication of a set of neighboring cells of the first network supporting paging over the second network.

According to an example embodiment of the second aspect, the method may further comprise: performing cell reselection to a cell of the set of neighboring cells of the first network supporting paging over the second network, in response to detecting the cell reselection condition for the first network; and continuing monitoring the paging channel of the second network, or initiating monitoring a second paging channel of the second network based on paging configuration information received from the reselected cell.

According to an example embodiment of the second aspect, the method may further comprise transitioning to the idle mode with respect to the first network, in response to detecting the fallback condition.

According to an example embodiment of the second aspect, the method may further comprise: detecting at least one paging response parameter in the paging configuration information or the paging message; and transmitting the paging response to the first network based on the at least one paging response parameter.

According to an example embodiment of the second aspect, the at least one paging response parameter may comprise at least one of a cell identifier of the first network or a frequency of the first network.

According to an example embodiment of the second aspect, the paging configuration information may comprise a radio resource control connection release message.

According to an example embodiment of the second aspect, the method may further comprise receiving, from the second network, control information comprising at least one of an indication of paging subframe offset relative to a paging subframe configured for the second network, an indication of a paging radio network temporary identifier, an identifier of a wake-up signal sequence, or an indication of a temporal location of a wake-up signal.

According to an example embodiment of the second aspect, the method may further comprise monitoring the paging channel of the second network based on at least one of the paging subframe offset, the paging radio network temporary identifier, or the wake-up signal.

According to an example embodiment of the second aspect, the control information may comprise at least one of: an indication of an update of system information of the first network, a system information value tag of the first network, or a physical cell identifier and/or frequency information of a cell of the first network associated with a current cell of the second network, wherein the paging message is received from the current cell of the second network.

According to an example embodiment of the second aspect, the control information may be received in downlink control information, at least one system information block, at least one bandwidth reduced system information block, or at least narrowband system information block.

According to an example embodiment of the second aspect, the method may further comprise receiving, from the first network, an indication of at least one of a time-frequency location of at least one common channel of the second network, a time-frequency location of at least one common signal of the second network, or timing information of the second network.

According to an example embodiment of the second aspect, the method may further comprise detecting the paging message based on a type of the paging message and an identifier associated with the first network, wherein the type of the paging message indicates use of an identifier associated with the first network in the paging message.

According to a third aspect, a computer program may comprise instructions for causing an apparatus to perform at least the following: receiving, from a first network, paging configuration information comprising an indication of at least one paging parameter for monitoring a paging channel of a second network; monitor the paging channel of the second network based on the at least one paging parameter; and transmitting a paging response to the first network, in response to receiving a paging message from the paging channel of the second network. The computer program may further comprise instructions for causing the apparatus to perform any example embodiment of the method of the second aspect.

According to a fourth aspect, an apparatus may comprise means for receiving, from a first network, paging configuration information comprising an indication of at least one paging parameter for monitoring a paging channel of a second network; means for monitoring the paging channel of the second network based on the at least one paging parameter; and means for transmitting a paging response to the first network, in response to receiving a paging message from the paging channel of the second network. The apparatus may further comprise means for performing any example embodiment of the method of the second aspect.

According to a fifth aspect, an apparatus may comprise at least one processor and at least one memory including computer program code, the at least one memory and the computer code configured to, with the at least one processor, cause the apparatus at least to: transmit, to a client node, paging configuration information comprising an indication of at least one first paging parameter for monitoring a paging channel of a second network; transmit, to the second network, paging configuration information comprising at least one second paging parameter for transmitting a paging message associated with a first network to the client node; and receive a paging response from the client node.

According to an example embodiment of the fifth aspect, the at least one memory and the computer code may be further configured to, with the at least one processor, cause the apparatus to: receive, from the client node, an indication of a capability to receive paging messages associated with the first network from the second network; and transmit the paging configuration information to the second network, in response to receiving the indication of the capability of the client node to receive paging messages associated with the first network from the second network.

According to an example embodiment of the fifth aspect, the indication of the capability may indicate capability to receive paging messages from the second network in a narrowband idle mode with respect to the second network.

According to an example embodiment of the fifth aspect, the at least one first paging parameter or the at least one second paging parameter may comprise at least one of a discontinuous reception cycle, an international mobile subscriber identity, or an inactive radio network temporary identifier.

According to an example embodiment of the fifth aspect, the paging configuration information transmitted to the client node may comprise at least one of: an indication of a cell reselection condition for the first network, an indication of a set of neighboring cells of the first network supporting paging over the second network, or an indication of a fallback condition for transitioning to an idle mode with respect to the first network.

According to an example embodiment of the fifth aspect, the paging configuration information transmitted to the client node or the paging configuration information transmitted to the second network may comprise at least one paging response parameter.

According to an example embodiment of the fifth aspect, the at least one paging response parameter may comprise at least one of a cell identifier of the first network or an indication of a frequency of the first network.

According to an example embodiment of the fifth aspect, the paging configuration information transmitted to the client node may comprise a radio resource control connection release message.

According to an example embodiment of the fifth aspect, the at least one memory and the computer code may be further configured to, with the at least one processor, cause the apparatus to: transmit, to the client node, an indication of a time-frequency location of at least one common channel of the second network, a time-frequency location of at least one common signal of the second network, or timing information of the second network.

According to a sixth aspect, a method may comprise transmitting, to a client node, paging configuration information comprising an indication of at least one first paging parameter for monitoring a paging channel of a second network; transmitting, to the second network, paging configuration information comprising at least one second paging parameter for transmitting a paging message associated with a first network to the client node; and receiving a paging response from the client node.

According to an example embodiment of the sixth aspect, the method may further comprise: receiving, from the client node, an indication of a capability to receive paging messages associated with the first network from the second network; and transmitting the paging configuration information to the second network, in response to receiving the indication of the capability of the client node to receive paging messages associated with the first network from the second network.

According to an example embodiment of the sixth aspect, the indication of the capability may indicate capability to receive paging messages from the second network in a narrowband idle mode with respect to the second network.

According to an example embodiment of the sixth aspect, the at least one first paging parameter or the at least one second paging parameter may comprise at least one of a discontinuous reception cycle, an international mobile subscriber identity, or an inactive radio network temporary identifier.

According to an example embodiment of the sixth aspect, the paging configuration information transmitted to the client node may comprise at least one of: an indication of a cell reselection condition for the first network, an indication of a set of neighboring cells of the first network supporting paging over the second network, or an indication of a fallback condition for transitioning to an idle mode with respect to the first network.

According to an example embodiment of the sixth aspect, the paging configuration information transmitted to the client node or the paging configuration information transmitted to the second network may comprise at least one paging response parameter.

According to an example embodiment of the sixth aspect, the at least one paging response parameter may comprise at least one of a cell identifier of the first network or an indication of a frequency of the first network.

According to an example embodiment of the sixth aspect, the paging configuration information transmitted to the client node may comprise a radio resource control connection release message.

According to an example embodiment of the sixth aspect, the method may further comprise transmitting, to the client node, an indication of a time-frequency location of at least one common channel of the second network, a time-frequency location of at least one common signal of the second network, or timing information of the second network.

According to a seventh aspect, a computer program may comprise instructions for causing an apparatus to perform at least the following: transmitting, to a client node, paging configuration information comprising an indication of at least one first paging parameter for monitoring a paging channel of a second network; transmitting, to the second network, paging configuration information comprising at least one second paging parameter for transmitting a paging message associated with a first network to the client node; and receiving a paging response from the client node. The computer program may further comprise instructions for causing the apparatus to perform any example embodiment of the method of the sixth aspect.

According to an eighth aspect, an apparatus may comprise means for transmitting, to a client node, paging configuration information comprising an indication of at least one first paging parameter for monitoring a paging channel of a second network; means for transmitting, to the second network, paging configuration information comprising at least one second paging parameter for transmitting a paging message associated with a first network to the client node; and means for receiving a paging response from the client node. The apparatus may further comprise means for performing any example embodiment of the method of the sixth aspect.

According to a ninth aspect, an apparatus may comprise at least one processor and at least one memory including computer program code, the at least one memory and the computer code configured to, with the at least one processor, cause the apparatus at least to: receive, from a first network, paging configuration information comprising at least one paging parameter for transmitting a paging message associated with the first network to a client node from a second network; and transmit, to the client node, the paging message associated with the first network based on the at least one paging parameter.

According to an example embodiment of the ninth aspect, the at least one paging parameter may comprise at least one of a discontinuous reception cycle, an international mobile subscriber identity, or an inactive radio network temporary identifier.

According to an example embodiment of the ninth aspect, the paging message may comprise at least one paging response parameter.

According to an example embodiment of the ninth aspect, the at least one paging response parameter may comprise at least one of a cell identifier of the first network or an indication of a frequency of the first network.

According to an example embodiment of the ninth aspect, a type of the paging message may indicate use of an identifier associated with the first network in the paging message.

According to an example embodiment of the ninth aspect the at least one memory and the computer code may be further configured to, with the at least one processor, cause the apparatus to transmit, to the client node, control information comprising at least one of: an indication of a paging subframe offset relative to a paging occasion configured for the second network, an indication of a paging radio network temporary identifier, an identifier of a wake-up signal sequence, or an indication of a temporal location of the wake-up signal.

According to an example embodiment of the ninth aspect the control information may comprise at least one of: an indication of an update of system information of the first network, a system information value tag of the first network, or a physical cell identifier and/or frequency information of a cell of the first network associated with a current cell of the second network, wherein the paging message is transmitted at the current cell of the second network.

According to an example embodiment of the ninth aspect, the control information may be transmitted in downlink control information, at least one system information block, at least one bandwidth reduced system information block, or at least one narrowband system information block.

According to a tenth aspect, a method may comprise: receiving, from a first network, paging configuration information comprising at least one paging parameter for transmitting a paging message associated with the first network to a client node from a second network; and transmitting, to the client node, the paging message associated with the first network based on the at least one paging parameter.

According to an example embodiment of the tenth aspect, the at least one paging parameter may comprise at least one of a discontinuous reception cycle, an international mobile subscriber identity, or an inactive radio network temporary identifier.

According to an example embodiment of the tenth aspect, the paging message may comprise at least one paging response parameter.

According to an example embodiment of the tenth aspect, the at least one paging response parameter may comprise at least one of a cell identifier of the first network or an indication of a frequency of the first network.

According to an example embodiment of the tenth aspect, a type of the paging message may indicate use of an identifier associated with the first network in the paging message.

According to an example embodiment of the tenth aspect the method may further comprise: transmitting, to the client node, control information comprising at least one of: an indication of a paging subframe offset relative to a paging occasion configured for the second network, an indication of a paging radio network temporary identifier, an identifier of a wake-up signal sequence, or an indication of a temporal location of the wake-up signal.

According to an example embodiment of the tenth aspect the control information may comprise at least one of: an indication of an update of system information of the first network, a system information value tag of the first network, or a physical cell identifier and/or frequency information of a cell of the first network associated with a current cell of the second network, wherein the paging message is transmitted at the current cell of the second network.

According to an example embodiment of the tenth aspect, the control information may be transmitted in downlink control information, at least one system information block, at least one bandwidth reduced system information block, or at least one narrowband system information block.

According to an eleventh aspect, a computer program may comprise instructions for causing an apparatus to perform at least the following: receiving, from a first network, paging configuration information comprising at least one paging parameter for transmitting a paging message associated with the first network to a client node from a second network; and transmitting, to the client node, the paging message associated with the first network based on the at least one paging parameter. The computer program may further comprise instructions for causing the apparatus to perform any example embodiment of the method of the tenth aspect.

According to a twelfth aspect, an apparatus may comprise means for receiving, from a first network, paging configuration information comprising at least one paging parameter for transmitting a paging message associated with the first network to a client node from a second network; and means for transmitting, to the client node, the paging message associated with the first network based on the at least one paging parameter. The apparatus may further comprise means for performing any example embodiment of the method of the tenth aspect.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 7 illustrates an example of a message sequence between a dual-mode user equipment and an LTE network node for delivery of paging control information, according to an example embodiment;

FIG. 9 illustrates an example of a method for receiving paging at a client node, according to an example embodiment;

FIG. 10 illustrates an example of a method for configuring paging of a client node by a network node, according to an example embodiment; and FIG. 11 illustrates an example of a method for paging a client node by a network node of behalf of another network node, according to an example embodiment.

Like references are used to designate like parts in the accompanying drawings.

DETAILED DESCRIPTION

Figure 1:
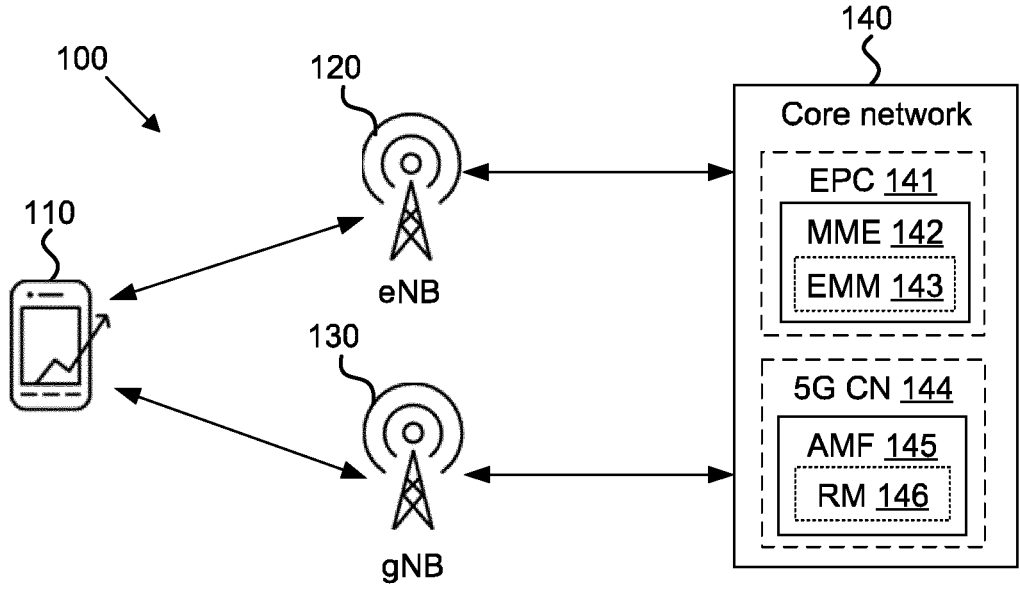
FIG. 1 illustrates an example of a network comprising network nodes and a client node, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Technologies such as Narrowband (NB) IoT (Internet of Things), LTE-M (Long Term Evolution-Machine type communication), and eMTC (enhanced Machine Type Communication) as specified by the $3^{rd}$ Generation Partnership Project (3GPP) enable low power communication over cellular communication networks. However, low power technologies like NB-IoT or LTE-M may not provide sufficient communication capacity for all present or future applications. 3GPP 5G NR (New Radio), or simply NR, provides another radio access technology, which is targeted for various types of services such as enhanced mobile broadband (eMBB) communications, ultra reliable low latency communications (URLCC), and massive machine type communications (mMTC). However, power consumption of NR user equipment may be too high for some IoT type of applications.

It would be therefore desired to enable lower power consumption within the NR standard and for that purpose a low power profile of NR, e.g. NR-Light, may be provided. However, another concern is that heavily modifying the NR radio for NR-Light purposes would cause divergence in the chip set side and would not be attractive for chip set development. NR-Light is intended for addressing new use cases with IoT-type of requirements, which may not be met with NB-IoT or LTE-M, such as higher data rate, higher reliability, and lower latency than eMTC or NB-IoT, but on the other hand lower cost and complexity and longer battery life than NR eMBB.

One concern with NR is that its reference signals, for example synchronization signal block (SSB), may not enable energy efficient design of an NR radio, for example due to infrequent measurement opportunities. On the other hand, NB-IoT and LTE-M enable to reach lower power consumption due to: LTE's cell-specific reference signals (CRS), no impact of beamforming, and various UE power saving optimizations added on top of the LTE design. For example, because of the good CRS availability, a UE may wake up any time and quickly access the network. By contrast, in NR idle mode the UE may need to wait longer to accumulate enough energy due to the more infrequent CRSs, which results in waste of battery power. For example, idle power consumption has been estimated to be up to 45% higher compared to LTE and difference to NB-IoT or eMTC would be even higher.

It would be therefore desired to develop a system, which enables reasonable UE power consumption for reduced capability devices such as NR-Light devices or other low complexity devices, and which utilizes the NR physical layer (L1) without significant NR physical layer changes. Low UE power consumption is especially important in idle mode and in an in-active state. NR radio may have higher power consumption than NB-IoT or LTE-M radios, or even a basic LTE radio. NR-Light devices are intended for IoT type of applications and therefore they are aimed at providing longer battery life than NR eMBB centric devices. However, NR-Light devices are intended to be more capable IoT centric devices than NB-IoT or LTE-M devices. Changing radically the NR system, for example the NR physical layer, could cause issues for legacy devices and therefore this may not be a desirable approach. Also, NR physical layer changes for UE power optimizations would need to be made at the cost of NR system performance. Changes would also incur cost to the device design.

A dual-mode UE may have capability to access two networks, for example the NR network and the LTE or NB-IoT network, or to operate according to different profiles of a network. Power consumption may be reduced for example by using an approach where a dual-mode UE is registered at the LTE side, and once paged, the dual-mode UE is moved to the NR side. This may however involve moving the UE context from the EPC (Evolved Packet Core) of LTE to the 5G core. This may cause additional interaction between the two core networks and interoperability between different manufacturers may be also difficult to achieve. For example, modifications at the EPC side may be needed to understand the nature of such a dual-mode UE in order to parameterize the UE correctly. Example embodiments provide methods for reducing power consumption of a dual-mode UE without the need for UE context transfer between the two core networks. According to an example embodiment, a UE may receive paging configuration information from a first network. The paging configuration information may comprise paging parameter(s) for monitoring a paging channel of a second network. A network node of the second network may be configured to transmit paging messages on behalf of the first network. Based on the received paging configuration information, the UE may monitor the paging channel of the second network and receive a paging message associated with the first network from the second network. In response to receiving the paging message from the second network, the UE may transmit a paging response to the first network. The first network may provide higher communication capabilities than the second network. However, monitoring paging at the second network may be more energy efficient. For example, paging may be monitored at the second network with a radio that has lower power consumption than a radio used to communicate with the first network. Also, the paging procedure of the second network may be more energy efficient.

FIG. 1 illustrates an example of a network 100, according to an example embodiment. Network 100 may comprise at least one client node, which may be also referred to as a user node, user equipment (UE), a mobile terminal, a terminal, or the like. UE 110 may communicate with one or more base stations, such as for example an evolved NodeB (eNB) 120 of an LTE or NB-IoT network and a next generation NodeB (gNB) 130 of a 5G (NR) network, over wireless radio channel(s). In general, the eNB 120 and gNB 130 are provided as examples of base stations of first and second networks, respectively. The first and second networks may be also called primary and secondary networks, respectively. Base stations may be also called radio access network (RAN) nodes or just network nodes.

A base station may comprise any suitable radio access point. In general, a first network node may be configured to operate according to a first standard and a second network node may be configured to operate according to a second standard. A standard may be also understood as a profile or a subset of a certain specification or a group of specifications. For example, the first standard may comprise an NR-Light profile of NR. The second standard may comprise NB-IoT or LTE-M. Hence, the first network may comprise a 5G network, for example an NR or NR-Light network.

The second network may comprise an NB-IoT network or an LTE-M network. Even though example embodiments have been described using these particular standards and networks as examples, it is appreciated that example embodiments may be applied to networks that are based on any suitable standards, or profiles thereof. For example, in one example embodiment a first network may be configured to operate according to a wireless local area network standard, specified for example by IEEE 802.11 series or Wi-Fi alliance and the second network may be configured to operate according to a cellular standard, specified for example by 3GPP.

The network 100 may further comprise a core network 140. The core network 140 may functionally connect different types of base stations and thereby enable co-operation between RAN nodes. The core network 140 may be implemented by any suitable means. For example, the core network 140 may be configured according to the service based architecture (SBA) of 5G core network (CN) 144, which enables a plurality of interconnected network functions (NF) to access each other's service via a service based interface (SBI). The core network 140 may comprise one or more access and mobility management Functions (AMF) 145. An AMF 145 may be responsible for connection and mobility management. For example, an AMF 145 may receive and process connection and session request related information received from UE 110 via eNB 120 or gNB 130. An AMF 145 may comprise a registration management function (RM) 146 configured to handle registration and deregistration of UEs to the network.

Additionally, the core network 140 may be configured to operate according to the evolved packet core (EPC) 141 of LTE. For example, the core network 140 may comprise one or more mobility management entities (MME) 142. MME 142 may comprise an EMM (enhanced packet core Mobility management) function 143 configured for example to manage service requests from UE 110, handle paging procedure for UE 110, and control mobility of UE 110. The EMM 143 may be for example configured to allocate a tracking area for UE 110. A tracking area may comprise a plurality of cells where the UE 110 may move without updating its location at MME 142. UE 110 may determine whether it has moved to a new tracking area based on comparing a tracking area code (TAC) received from the current cell to a group of tracking area codes included in a tracking area list.

Radio resource control (RRC) may refer to provision of radio resource related control data. Radio resource control messages may be transmitted on various logical control channels such as for example a common control channel (CCCH) or a dedicated control channel (DCCH). Logical control channels may be mapped to one to more signaling radio bearers (SRB).

System information may comprise information provided by the network 100 to the UE 110, for example for performing cell selection, cell reselection, handover, or the like. System information may be provided in a master information block (MIB) and one or more system information blocks, for example on a broadcast control channel (BCCH).

Although some example embodiments have been described using particular RRC messages and system information blocks (SIB) as examples, it is appreciated that any suitable message(s) may be configured to carry the paging related signaling information described herein. Even though some example embodiments have been described using the 4G (LTE) and/or 5G networks as examples, it is appreciated that example embodiments presented herein are not limited to these example networks and may be applied in any present or future communication networks, for example other type of cellular networks, short-range wireless networks, broadcast networks, or the like.

Figure 2:
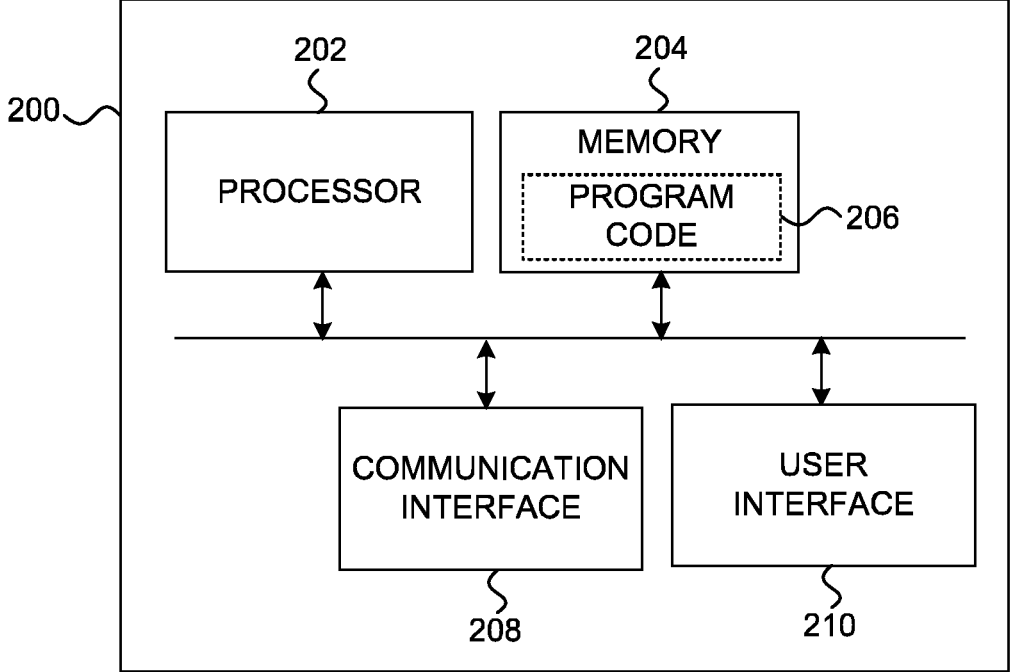
FIG. 2 illustrates an example of an apparatus configured to practice one or more example embodiments.

FIG. 2 illustrates an example embodiment of an apparatus 200, for example a client node such as for example UE 110, or a network node such as for example eNB 120 or gNB 130. The apparatus 200 may comprise at least one processor 202. The at least one processor may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a micro-controller unit (MCU), a hardware accelerator, a special-purpose computer chip, or the like.

The apparatus 200 may further comprise at least one memory 204. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus, such as for example the at least one processor and/or the memory, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus 200 comprises means for performing at least one method described herein. In one example, the means comprises the at least one processor 202, the at least one memory 204 including program code 206 configured to, when executed by the at least one processor, cause the apparatus 200 to perform the method.

The apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figures 3, 4:
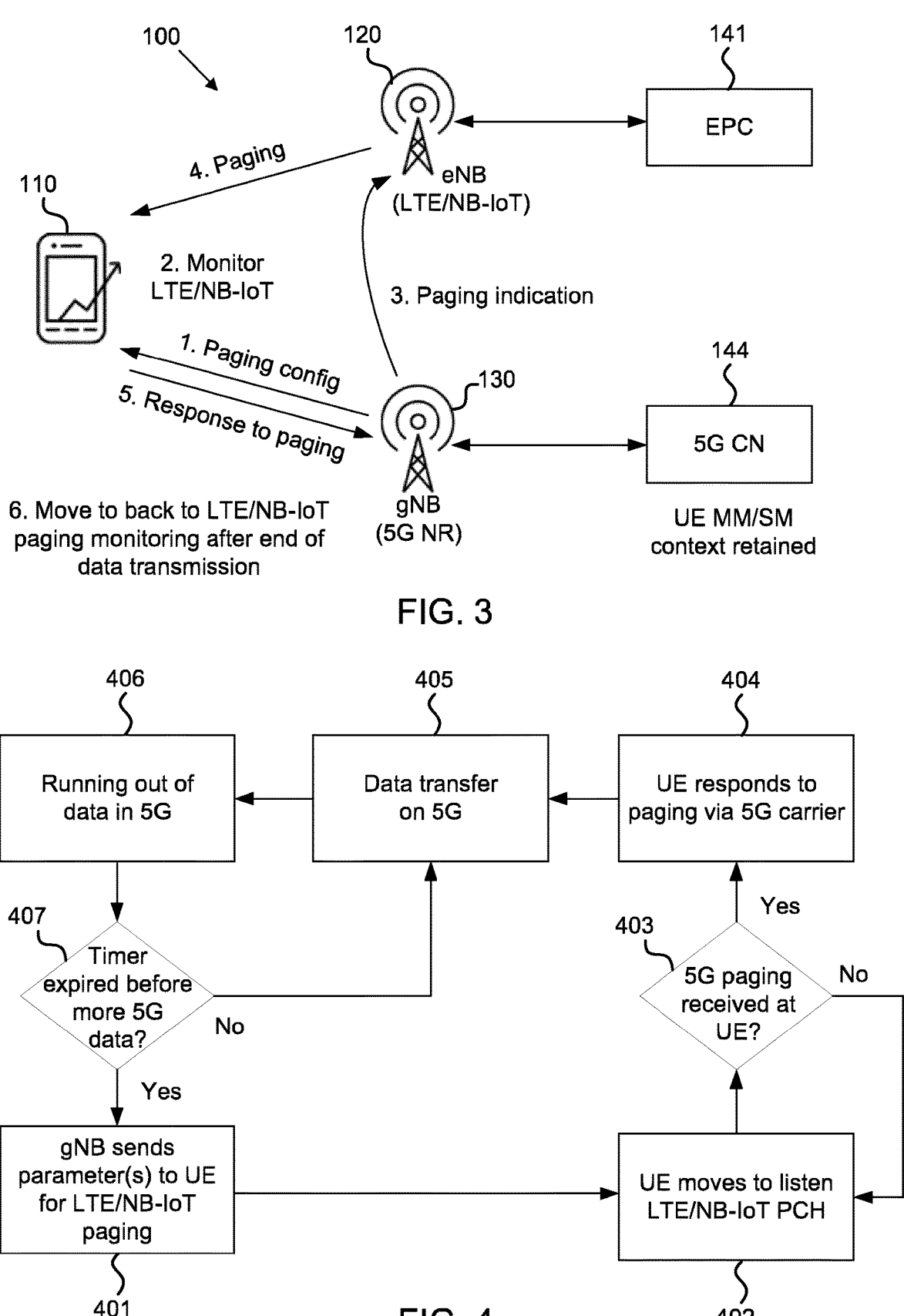
FIG. 3 illustrates an example of a procedure for paging a dual-mode user equipment, according to an example embodiment.
FIG. 4 illustrates an example of a flow chart for paging a dual-mode user equipment, according to an example embodiment.

FIG. 3 illustrates an example of a paging procedure for dual-mode user equipment, according to an example embodiment. When the UE 110 is connected to gNB 130 in idle mode, monitoring of the NR (Light) carrier may be replaced with monitoring the LTE or NB-IoT paging channel (PCH), which may be transmitted for example on a physical downlink shared channel (PDSCH) of LTE or a narrowband physical downlink shared channel (NPDSCH) of NB-IoT.

The gNB 130 may transmit paging configuration information, for example at least one paging configuration message, which may comprise instructions for monitoring the LTE or NB-IoT PCH for paging messages of NR. The paging configuration information may be provided for example as part of dedicated and/or broadcast signaling. In response to receiving the paging configuration information, the UE 110 may initiate listening or monitoring the LTE or NB-IoT PCH. For example, the UE 110 may be configured by the 5G side of the corresponding UE ID (identifier) to follow the LTE side. The UE 110 may determine a paging frame and/or a paging occasion to be monitored based on its international mobile subscriber identity (IMSI). Alternatively, the network may configure a particular IMSI value to be used. This IMSI value may then determine which UE ID triggers jumping to the LTE side. For example, the UE 110 may have an additional identifier other than an additional IMSI value. In response to detecting a paging message for the additional identifier, the UE 110 may jump to the 5G side. Another identifier may trigger the UE 110 going to the LTE side. Therefore, any identifier may be used in addition to the S-TMSI (serving temporary mobile subscribed identity), which may be normally used for paging. The UE 110 may be also informed about a discontinuous reception (DRX) cycle for monitoring the LTE or NB-IoT PCH.

The gNB 130 may provide inter-node signaling information, for example a paging indication, to eNB 120 in order to configure the eNB 120 to provide NR paging messages over LTE or NB-IoT and activate sending the paging message(s) accordingly. The paging indication may comprise paging configuration information with at least one paging parameter for transmitting paging messages associated with the NR network to the UE 110. The paging configuration information provided to eNB 120 may for example comprise an identifier associated with the NR network, such as for example an IMSI or I-RNTI (inactive radio network temporary identifier), to be used for paging the UE 110 at the LTE/NB-IoT side. The paging configuration information may further comprise a DRX cycle configured, or to be configured, for the UE 110 for receiving the NR paging over LTE/NB-IoT.

The eNB 120 may generate a paging message based on the received paging parameter(s). For example, the eNB 120 may insert the indicated NR identifier in the paging message or determine a transmission time for the paging message based on the indicated DRX cycle of the UE 110. The paging message(s) for NR may be then transmitted by the eNB 120, for example using a physical downlink shared channel (PDSCH) or a narrowband physical downlink shared channel (NPDSCH).

When receiving an NR paging message from the LTE/NB-IoT PCH, the UE 110 may transmit a paging response directly to the gNB 130. After end of data transmission via gNB 130, the UE 110 may move back to monitoring the LTE/NB-IoT PCH. This procedure results in the same idle mode power consumption as LTE or NB-IoT thanks to the same radio resource management (RMM) operations. Furthermore, the UE context may be retained at the 5G core network (CN) 144 and therefore this procedure enables to avoid UE context transfer between LTE and 5G. Furthermore, this procedure enables energy efficient paging without defining new narrowband operations for NR, which could result in L1 (Layer 1) changes, new L1 wake-up signals, or new synchronization signal block structures (for example with more frequent DMRS occurrence) in order to achieve lower idle mode power consumption and thereby longer device stand-by time.

FIG. 4 illustrates an example of a flow chart for paging a dual-mode user equipment, according to an example embodiment.

At operation 401, the gNB 130 may send paging parameter(s) to UE 110 to configure the UE 110 for receiving NR paging messages over LTE or NB-IoT.

At operation 402, the UE 110 may move to listen to a paging channel of LTE or NB-IoT. Listening the paging channel may be based on the received paging parameter(s).

At operation 403, the UE 110 may determine whether an NR paging message has been received from the paging channel of LTE or NB-IoT. For example, the UE 110 may determine whether a paging message contains a UE ID derived from NR signaling. If no paging message associated with NR has been received from the paging channel of LTE or NB-IoT, the UE 110 may continue listening to the paging channel at 402. In response to determining that a paging message associated with NR has been received from the paging channel of LTE or NB-IoT, the UE 110 may move to operation 404.

At operation 404, the UE 110 may respond to the paging message via a 5G (NR) carrier. The paging response may be transmitted based on paging response parameter(s) received from the gNB 130 or the eNB 120.

At operation 405, the UE 110 and gNB 130 may transfer data over the 5G (NR) carrier.

At operation 406, the UE 110 and/or the gNB 130 may run out of 5G data to be transmitted. The UE 110 and/or the gNB 130 may further initiate a timer for determining whether to continue transfer of further data on the 5G (NR) carrier.

At operation 407, the UE 110 and/or the gNB 130 may determine whether the timer has expired before more 5G data is received for transmission. If more data is received before expiry of the timer, the 5G data transfer may continue at operation 405. In response to detecting expiry of the timer before receiving more 5G data for transmission, the gNB 130 may move back to operation 401 to reconfigure the UE 110 for 5G (NR) paging over LTE or NB-IoT.

5G paging over LTE or NB-IoT enables 5G data rates and low latency with reduced idle mode power consumption due to the more energy efficient paging of LTE or NB-IoT, thereby enabling longer battery life for a dual-mode UE. Another benefit is that hardware implementation of the dual-mode UE is not impacted since simultaneous support for 5G and LTE or NB-IoT is not needed. Another benefit is that context transfer between EPC 141 and 5G CN 144 may be avoided. Hence, modifications to the EPC 141 may be avoided.

According to an example embodiment, the UE 110 may determine whether it is (substantially) stationary, for example based on being connected to the same eNB 120 and being within a predetermined range. UE 110 may determine to be within the predetermined range for example if a signal strength from eNB 120, for example the reference signal received power (RSRP), is above a threshold. While monitoring the LTE or NB-IoT network for NR paging, the UE 110 may be configured to check availability of the NR signal if the signal strength decreases, for example below the threshold. If the NR signal is no longer available with sufficient strength, the UE 110 may determine to perform cell reselection to LTE. A tracking area update may be also performed accordingly.

The UE 110 may be also configured to monitor the NR signal for cell reselection purposes at preconfigured or signaled time intervals to ensure the NR coverage is still there, even if the UE 110 were monitoring NR paging based on LTE or NB-IoT. Monitoring the NR signal when paging is configured to be provided via LTE or NB-IoT could be relaxed compared to normal NR requirements to maintain the power saving benefits. For example, the time interval configured for NR cell reselection monitoring may be longer than a time interval configured for monitoring a paging channel of NR, when NR paging is provided by the NR network itself.

Figure 5:
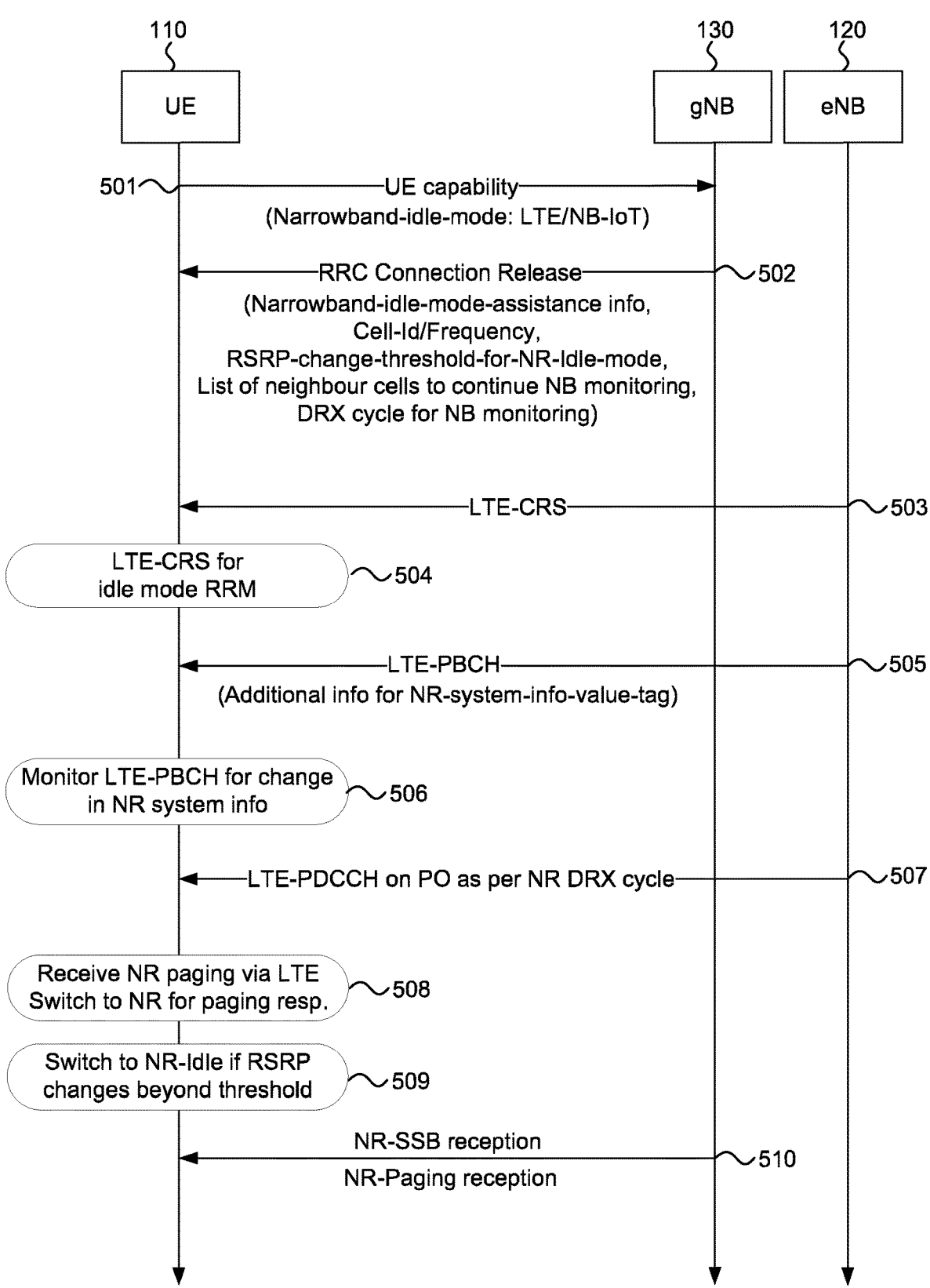
FIG. 5 illustrates an example of a message sequence between a dual-mode user equipment, a 5G New Radio (NR) network node, and an LTE or NB-IoT network node for paging the dual-mode user equipment, according to an example embodiment.

FIG. 5 illustrates an example of a message sequence between a dual-mode user equipment, an NR network node, and an LTE or NB-IoT network node for paging the dual-mode user equipment, according to an example embodiment. The gNB 130 and eNB 120 are provided as examples of network nodes of first and second networks, in this example the NR (Light) and LTE or NB-IoT networks, respectively.

At operation 501, the UE 110 may transmit an indication of a capability to receive paging messages associated with the NR network from the LTE or NB-IoT network. The indication may be transmitted to gNB 130. The indication of the capability may indicate a capability to receive paging messages from NB-IoT network in a narrowband idle mode. A narrowband idle mode may in general refer to an idle mode with respect to a secondary network that has lower idle mode power consumption and/or lower communication capability compared to a primary network for which the secondary network provides the paging service. For example, a narrowband idle mode may comprise an RRC IDLE mode with respect to the LTE or NB-IoT network when monitoring for NR paging from the LTE or NB-IoT network. However, while being in RRC IDLE mode with respect to LTE or NB-IoT, the UE 110 may be in another mode, for example RRC INACTIVE, with respect to the NR network. The indication of the capability may be provided as a new UE capability entry of 'narrowband-idle-mode', which may in general indicate the capability of receiving NR paging messages over a secondary network, for example LTE or NB-IoT. The gNB 130 may receive the indication of the capability of the UE 110 to receive paging messages associated with the NR from the LTE/NB-IoT network. In response to receiving this capability indication, the gNB 130 may configure eNB 120 for transmitting paging messages associated with NR, as discussed with reference to FIG. 3. For example, gNB 130 may transmit paging configuration information to eNB 120. The paging configuration information may comprise at least one paging parameter, for example for handling NR paging over the LTE or NB-IoT network.

At operation 502, the gNB 130 may transmit an RRC connection release message to UE 110. The RRC connection release message may comprise narrowband idle mode assistance information. The RRC connection release message may therefore comprise, for example as the narrowband idle mode assistance information, an indication of at least one paging parameter for monitoring a paging channel of the LTE or NB-IoT network. The at least one paging parameter may for example comprise DRX cycle, an IMSI, or an I-RNTI. An indication of a paging parameter may comprise a value for the paging parameter, for example a particular value of IMSI. Alternatively, an indication of a paging parameter may comprise an indication of a paging parameter without a value for the parameter. For example, the gNB 130 may request the UE 110 to monitor the paging channel of LTE or NB-IoT based on an IMSI value that is preconfigured at UE 110. Alternatively, the gNB 130 could provide the UE 110 with a special IMSI value for monitoring the LTE or NB-IoT network for NR paging. The UE 110 may receive RRC connection release message from the gNB 130.

The RRC connection release message may further comprise an indication of a fallback condition for transitioning to an idle mode, e.g. an RRC IDLE mode, with respect to the NR network. The fallback condition may be associated with a radio condition between the UE 110 and gNB 130, for example a signal strength of gNB 130 such as the RSRP at the UE 110. Hence, the fallback condition may for example comprise an RSRP change threshold for transitioning to NR idle mode.

The RRC connection release message is an example of paging configuration information, but it is understood that similar information may be provided by other control messages or within control information such as for example one or more system information blocks. Furthermore, even though some messages have been described as single messages, it is appreciated that similar information may be transmitted using multiple messages. For example, the paging parameters may be distributed over a plurality of paging configuration messages.

The RRC connection release message may further comprise an indication of a cell reselection condition for the NR network. The cell reselection condition may be associated with a radio condition, for example the RSRP, between UE 110 and the gNB 130. However, the threshold for cell reselection may be different from the threshold for fallback to the idle mode of NR.

The RRC connection release message may further comprise an indication of a set of neighboring cells, for example a list of neighboring cells, of the NR network supporting paging over LTE or NB-IoT. The indication may be provided in order to inform the UE 110 about the neighboring NR cells, where the UE 110 may continue monitoring for NR paging at the LTE or NB-IoT side.

Figure 6:
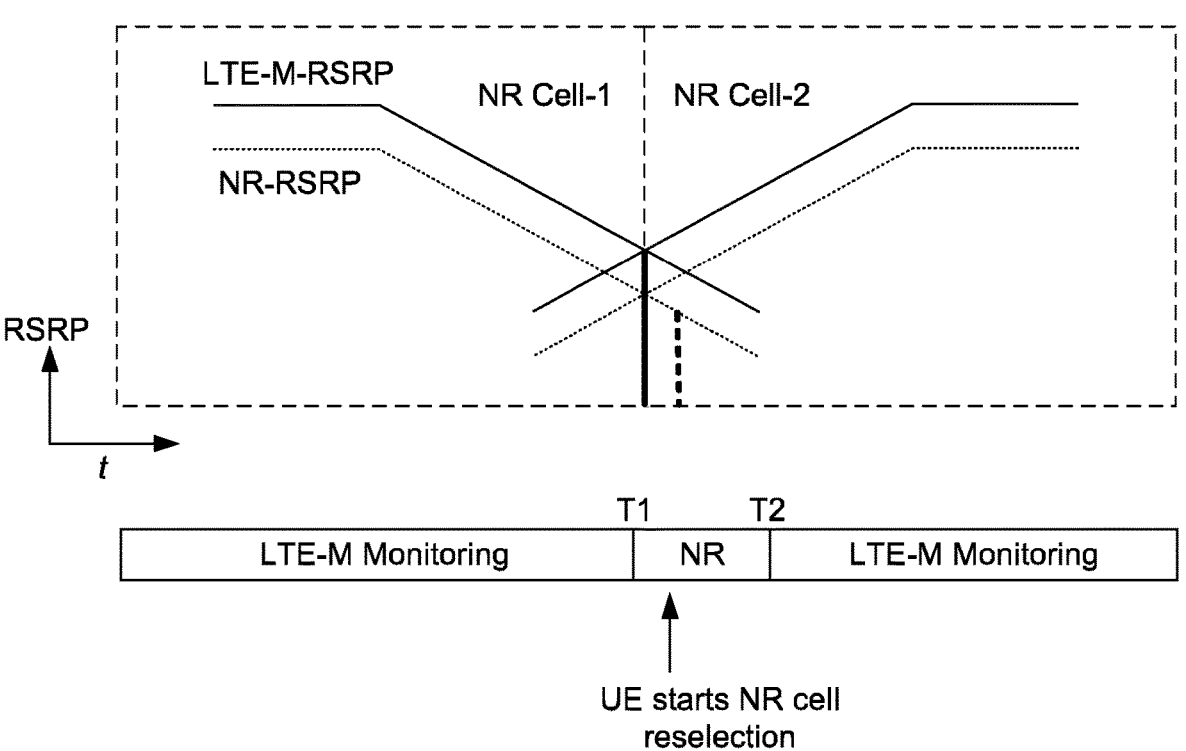
FIG. 6 illustrates an example of a 5G New Radio (NR) cell reselection procedure during paging monitoring via LTE or NB-IoT, according to an example embodiment.

FIG. 6 illustrates an example of an NR cell reselection procedure during paging monitoring via LTE, according to an example embodiment. The procedure may be applied for performing NR cell reselection during a narrowband idle mode, for example at an NR-Light UE 110. LTE-M is used as an example of the second network that provides paging services for the first network, 5G NR. The RSRPs of LTE-M signal (LTE-M-RSRP) and NR signal (NR-RSRP), as well as corresponding operations at UE 110, are illustrated with respect to time, t. Initially, the UE 110 may be monitoring a paging channel at a first cell of LTE-M. The UE 110 may be at an inactive mode (e.g. RRC INACTIVE) with respect to the NR network. The UE 110 may be located at a first cell of NR (NR Cell-1). The RSRP of LTE-M may be higher than the RSRP of NR. As illustrated in FIG. 6, the received signal strengths may start to decrease and at a first time instant, T1, the NR signal may reach the threshold for cell reselection. The UE 110 may therefore determine that the cell reselection condition has been detected.

At the first time instant, T1, the UE 110 may start NR cell reselection. The cell reselection may be performed to an NR cell belonging to the set of neighboring cells indicated to support paging over LTE or NB-IoT. Performing the NR cell reselection may be in response to detecting the cell reselection condition to be satisfied. If a new NR cell (NR Cell-2) is found, the UE 110 may complete the system acquisition and maintain the new (reselected) cell as a reference cell for uplink, for example for transmitting paging responses.

At a second (subsequent) time instant, T2, the UE 110 may move back to LTE-M to continue monitoring of the paging channel at the first LTE-M cell. Alternatively, the new NR cell (NR Cell-2) may transmit an indication of a second cell of LTE-M for NR paging. The indication may be for example provided in paging configuration information, for example at least one paging configuration message, other control message(s), or other control information. In response to receiving such indication, the UE 110 may initiate monitoring a paging channel of the second cell of LTE-M at the second time instant, T2.

If the UE 110 does not find an NR cell that is indicated to support NR paging over LTE-M, the UE 110 may reselect an NR cell that does not support NR paging over LTE-M and discontinue monitoring LTE-M for NR paging messages.

Referring back to FIG. 5, at operation 503 the UE 110 may receive LTE cell-specific reference signal (CRS) transmitted by eNB 120.

At operation 504, the UE 110 may perform idle mode radio resource management (RRM) based on the LTE-CRS.

At operation 505, eNB 120 may transmit control information comprising an indication of a current version of NR system information, for example an NR system information value tag. The control information may be transmitted for example on a physical broadcast channel (PBCH) of LTE. The UE 110 may receive the control information.

At operation 506, the UE 110 may monitor the LTE network, for example the PBCH, for a change in the NR system information. If an indication of a change or NR system information is detected, for example the NR system information value tag is detected to increase, the UE 110 may activate its NR radio and receive the updated system information from gNB 130. However, if no change is indicated, the UE 110 may continue monitoring the paging channel of LTE/NB-IoT for NR paging messages while keeping the NR radio in a low power state.

At operation 507, the eNB 120 may transmit a paging message. The paging message may be transmitted on an LTE physical downlink control channel (PDCCH). The paging message may be transmitted based on at least one paging parameter configured for UE 110 for receiving NR paging over LTE/NB-IoT. For example, the paging message may include a UE identifier associated with the NR network or the paging message may be transmitted on a particular paging occasion (PO) of a paging frame (PF). The paging occasion may be determined by eNB 120 based on the DRX cycle configured for UE 110. As discussed above, the UE 110 may be informed about the paging parameter(s) by gNB 130. Alternatively, or additionally, the eNB 120 may transmit an indication of at least one paging parameter to the UE 110. The eNB 120 may receive an indication of the paging parameter(s) from gNB 130, for example within inter-node signaling as one or more paging configuration messages. The paging message transmitted by eNB 120 may also comprise an indication of an NR carrier to use for data communication, for example a mobile terminated call.

At operation 508, the UE 110 may monitor the paging channel of the LTE or NB-IoT network based on the paging parameter(s). The UE 110 may then receive the NR paging message from eNB 120 on the monitored paging channel of the LTE or NB-IoT network. In response to receiving the paging message, the UE 110 may switch to NR and transmit a paging response to gNB 130, or in general to the NR network. The paging response may be transmitted based on paging response parameter(s) detected in the paging configuration information received from gNB 130 or the paging message received from eNB 120. The gNB 130 may transmit the paging response parameter(s) to UE 110 directly, for example in the paging configuration information. Alternatively, or additionally, the gNB 130 may transmit the paging response parameter(s) to eNB 120, which may forward the paging response parameter(s) to UE 110, for example in the paging message. The paging response parameter(s) may comprise for example at least one of a cell identifier of the NR network or a frequency of the NR network. The paging response may be transmitted to the identified cell and/or at the indicated frequency. In general, the paging message could be decoded using another radio access technology (RAT) than the actual data communication, for example a mobile terminated or mobile-originated call, is performed by the UE 110.

The gNB 130 may receive the paging response message from the UE 110. In response to receiving the paging response, the gNB 130 may establish a connection with the UE 110 and initiate 5G data transfer on the NR carrier.

At operation 509, for example while monitoring the paging channel of the LTE or NB-IoT network, the UE 110 may monitor the strength of the LTE or NB-IoT signal, for example the RSRP. As discussed above, the RRC connection release message may comprise an indication of a fallback condition for transitioning to NR idle mode. In response to detecting the fallback condition, for example the RSRP falling below a fallback threshold, the UE 110 may transition to the idle mode with respect to the NR network. Furthermore, the UE 110 may discontinue monitoring the LTE/NB-IoT for NR paging messages.

At operation 510, the UE 110 may receive NR synchronization signal blocks (SSB) and/or NR paging messages of from gNB 130. This enables to ensure delivery of NR paging messages to the dual-mode UE 110 in case of degraded radio conditions at the LTE or NB-IoT side.

FIG. 7 illustrates an example of a message sequence between a dual-mode user equipment and an LTE network node for delivery of paging control information, according to an example embodiment. Operations 701 and 702 enable configuration of a paging occasion for the NR (Light) UE 110. Operations 703 to 705 enable configuration of changes for monitoring a physical downlink control channel (PDCCH) and wake-up signals (WUS). A PDCCH may comprise a physical layer channel carried at predetermined location(s) of a downlink subframe, for example a predetermined number of first OFDM symbol(s) of a downlink subframe. PDCCH may be used to transmit paging messages. Operations 706 and 707 enable LTE paging for the NR (Light) UE 110. Operations 708 and 709 enable LTE system support for NR system information changes. Even though the above operations have been illustrated as a single message sequence, it is understood that the operations may be applied separately or in different combinations.

At operation 701, the eNB 120 may transmit control information to UE 110. UE 110 may receive the control information. The control information may be provided as LTE system information, for example in one or more system information blocks (SIB). The control information may comprise paging parameter(s) to configure UE 110 for reception of NR paging from eNB 120. For example, the control information may comprise an indication of a paging subframe (PS) offset. The UE 110 may be configured to monitor a particular paging occasion for reception of LTE paging messages. The paging subframe offset may be relative to the paging occasion configured for LTE paging. A paging occasion may comprise a particular subframe in a paging frame (PF). A paging frame may be transmitted on the paging channel. A paging frame may comprise one or more paging occasions (subframes). In case of a paging event for UE 110, the paging occasion may comprise an identifier of the UE 110 such as for example a paging radio network temporary identifier (P-RNTI).

At operation 702, the UE 110 may use the paging subframe offset information to calculate a paging occasion to be monitored for NR paging. The paging occasion for NR paging may be calculated based on at least an identifier of the UE 110 associated with the NR (Light) network and the indicated paging subframe offset. The paging frame (PF) and paging occasion (PO) may be derived from an identifier of the UE 110, for example as follows:

System frame number (SFN) for the paging frame may be determined based on (SFN+PF_offset) mod T=(T div N)*(UE_ID mod N).

Index (i_s), indicating the start of a set of PDCCH monitoring occasions for the paging DCI, may be determined based on i_s=floor(UE_ID/N) mod Ns.

In the above formulae, T is the DRX cycle of UE 110, N is the number of total paging frames in the DRX cycle T, Ns is the number of paging occasions for a paging frame, PF_offset is an offset used for PF determination, and UE ID may be for example the 5G-S-TMSI of UE 110 modulo 1024. Use of the paging subframe offset enables to ensure that NR paging messages are not sent on the same paging occasion as LTE and hence unnecessary wake-up of narrowband IoT devices may be avoided. Alternatively, the UE 110 may be configured to monitor the same paging occasion as for LTE paging, but to use a different identifier value, for example different P-RNTI, to avoid false wakeup. To configure the UE 110 to monitor the same paging occasion, the eNB 120 may set the paging subframe offset to zero, or transmit another indication of the use of same paging occasion for both LTE and NR paging.

At operation 703, the eNB 120 may transmit control information to UE 110, for example as LTE system information, as described above. The control information may comprise an indication of an identifier, for example P-RNTI, to detect NR paging messages on the LTE paging channel. The identifier may be an identifier used for UE 110 at the NR network, for example an NR P-PRNTI. The control information may further comprise information associated with a wake-up signal (WUS), for example an identifier of a wake-up signal sequence and/or an indication of a temporal location of the wake-up signal. A wake-up signal may be used to wake up the UE 110 from a sleep mode to detect if the UE 110 is paged at a paging occasion. The wake-up signal may be received by a low-power wake-up receiver of UE 110 and therefore the main LTE receiver may be kept in a low-power state longer than the normal DRX cycle, which reduces power consumption. The temporal location for the WUS may be signaled for example based on an offset relative to the paging occasion, for example by indicating how much before the relevant paging occasion the WUS occurs. A separate UE capability indicating how much time UE needs to wake-up after receiving a WUS may be provided by the UE 110 to the network, for example to the gNB 130 or the eNB 120.

At operation 704, the UE 110 may monitor for the NR (Light) specific wake-up signal based on the control information. For example, the UE 110 may monitor the paging channel, for example on the PDCCH, for a wake-up signal at the indicated temporal location and/or a wake-up signal comprising the indicated wake-up sequence. Alternatively, the wake-up signal may be transmitted on a separate channel, for example on a more narrowband transmission channel. The UE 110 may therefore initially monitor the separate wake-up signal channel instead of the paging channel. In response to receiving the wake-up signal, the UE 110 may turn the main LTE receiver on and start monitoring the paging channel on LTE-PDCCH for NR paging messages.

At 705, the UE 110 may monitor the paging channel based on the control information. For example, the UE 110 may monitor the paging occasion determined at 702. The UE 110 may monitor the paging channel for the identifier indicated in the control information received from eNB 120 at 703, for example the NR-P-RNTI.

At operation 706, the eNB 120 may transmit a paging message. The paging message may be of a particular type, for example an RRC-Paging-IRAT (inter-RAT) message. The type of the paging message may indicate use of NR identifier(s) in the paging message. The paging message may therefore comprise an NR paging identifier for UE 110. The paging message may further comprise redirection information for transmitting a paging response, for example one or more paging response parameters. The paging response parameter(s) may for example indicate the NR carrier on which the UE 110 is requested to send the paging response. An NR carrier may be identified by a cell identifier and frequency. The UE 110 may receive the paging message. The UE 110 may detect the paging message based on the NR identifier. Detecting the paging message may be further based on the type of the paging message. For example, the UE 110 may first detect a type of a paging message. If the type of the paging message indicates use of NR identifier(s), the UE 110 may determine whether its configured NR identifier is included in the paging message. If the type does not indicate use of NR identifier(s), the UE 110 may determine not to check the paging message for its NR identifier. Indicating the type of paging messages therefore enables the UE 110 to avoid looking for NR identifiers in paging messages that are known not to include NR identifiers.

At operation 707, the UE 110 may switch to the specific NR carrier configured for sending a paging response. The UE 110 may then transmit the paging response to gNB 130 on the NR carrier.

At operation 708, the eNB 120 may transmit further control information to UE 110, for example on the LTE-PDCCH. The control information may comprise information, for example additional downlink control information (DCI) bits, to indicate changes in NR system information. The DCI may be carried for example on LTE-PDCCH or MPDCCH (PDCCH of LTE-M). The control information may comprise an indication of an update of NR system information. This enables the UE 110 to be informed about changes in NR system information even though the UE 110 would not access the NR network while monitoring for NR paging at the LTE side. If the UE 110 detects a change in the NR system information, it may access the NR network to receive the updated system information from gNB 130.

At operation 709, the eNB 120 may transmit further control information to UE 110. The control information may be transmitted as part of LTE system information, for example in one or more system information blocks such as SIB1 or one or more bandwidth reduced system information blocks such as SIB1-BR (bandwidth reduced). The control information may comprise parameters to assist the UE 110 monitoring the LTE paging channel and also keep it synchronized with latest system information and cell. For example, the control information may comprise an NR (Light) physical cell identifier (PCI), frequency information shared by the LTE-M and NB-IoT cell, and NR (Light) system information value tag.

The PCI and/or the frequency information of the NR network may be used at UE 110 to determine which cell to connect after receiving an NR paging message from the eNB 120. The PCI and frequency information of the NR network may be associated with an NR cell that is associated, for example co-located, with a current cell of the LTE network.

The system information value tag may indicate a version of currently applicable system information. Based on the system information value tag the UE 110 may detect a change in NR system information. The UE 110 may then access the NR network to receive the updated system information from gNB 130.

The various control information described herein may be provided in any suitable control channel or signal. For example, the control information may be transmitted or received in downlink control information or system information. Downlink control information may be transmitted or received on the PDCCH. The system information may comprise one or more system information blocks (SIB) of LTE or one or more bandwidth reduced system information blocks (SIB-BR) of LTE-M. The control information may be also referred to as paging control information, paging signaling, narrowband paging control information, narrowband paging signaling, or the like.

Figure 8:
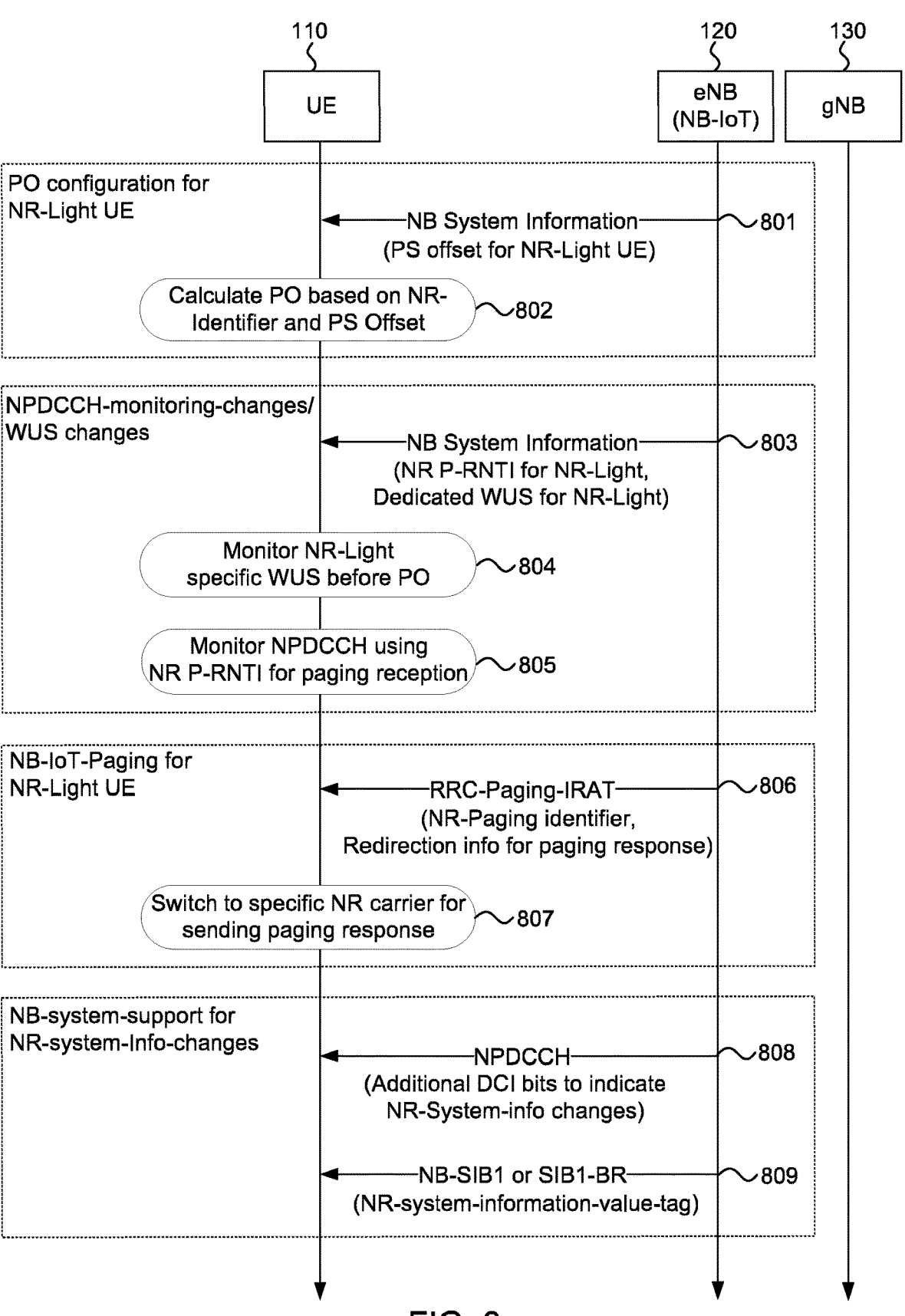
FIG. 8 illustrates an example of a message sequence between a dual-mode user equipment and an NB-IoT node for delivery of paging control information, according to an example embodiment.

FIG. 8 illustrates an example of a message sequence between a dual-mode user equipment and an NB-IoT node for delivery of paging control information, according to an example embodiment.

At operation 801, the eNB 120 (NB-IoT eNB) may transmit control information to UE 110, and UE 110 may receive the control information, similar to operation 701. However, the control information may be provided in narrowband system information (NB System Information), for example one or more narrowband system information blocks (NB-SIB) of NB-IoT.

At operation 802, the UE 110 may calculate the paging occasion for receiving NR paging from the eNB 120, similar to operation 702.

At operation 803, the eNB 120 may transmit further control information to UE 110, similar to operation 703. However, the control information may be provided in the narrowband system information.

At operation 804, the UE 110 may monitor for an NR (Light) specific wake-up signal before the paging occasion, similar to operation 704.

At operation 805, the UE 110 may monitor a narrowband PDCCH (NPDDCH) of NB-IoT for NR paging messages, similar to operation 705. Operations 803 to 805 enable configuration of changes for monitoring the NPDCCH and wake-up signals (WUS).

At operation 806, the eNB 120 may transmit a paging message, similar to operation 706. However, the paging message may be transmitted on a paging channel of NB-IoT, for example on the NPDCCH.

At operation 807, the UE 110 may switch to the specific NR carrier for sending a paging response, similar to operation 707. The UE 110 may then transmit the paging response to gNB 130 on the NR carrier.

At operation 808, the eNB 120 may transmit further control information to UE 110, similar to operation 708. However, the control information may be transmitted on a control channel of NB-IoT. For example, the DCI may be carried on NPDCCH (PDCCH of NB-IoT). The UE 110 may receive the control information on a corresponding channel.

At operation 809, the eNB 120 may transmit further control information to UE 110, similar to operation 709. However, the control information may be transmitted as part of the system information of NB-IoT. The system information may comprise one or more narrowband system information blocks (NB-SIB), for example NB-SIB1, of NB-IoT. Alternatively, or additionally, the control information may be provided in one or more bandwidth reduced system information blocks, such as for example SIB-BR1.

According to an example embodiment, the UE 110 may receive from gNB 130 control information, for example system information message(s), comprising information about LTE-M or NB-IoT common channel or common signal locations with reference to the correct network timing, to enable the UE 110 to switch back to narrowband monitoring. Common channels or signals may comprise channels or signals addressed to all or multiple UEs, such as for example broadcast channels or signals. The control information may for example comprise an indication of a time-frequency location of at least one common channel of the LTE or NB-IoT network, a time-frequency location of at least one common signal of the LTE or NB-IoT network, or timing information of the LTE or NB-IoT network. The timing information of the LTE or NB-IoT network may comprise timing information the LTE or NB-IoT control signals, for example paging signals, with respect to (frame) timing of the NR carrier. Based on this information the UE 110 may receive information on the common channels or common signals of the LTE or NB-IoT network. The common channels or signals may for example carry the various control information described herein. This enables UE 110 to directly access the relevant control information at the LTE or NB-IoT network based on the information received from the NR network.

As described above, the example embodiments enable energy efficient paging of dual-mode devices. Further advantages are the avoidance of the impact to idle mode power consumption of LTE, LTE-M, or NB-IoT devices and keeping paging capacity independent between LTE-only devices and devices that use LTE for idle mode operation.

FIG. 9 illustrates an example of a method 900 for receiving paging at a client node, according to an example embodiment.

At 901, the method may comprise receiving, from a first network, paging configuration information comprising an indication of at least one paging parameter for monitoring a paging channel of a second network.

At 902, the method may comprise monitoring the paging channel of the second network based on the at least one paging parameter. At 903, the method may comprise transmitting a paging response to the first network, in response to receiving a paging message from the paging channel of the second network.

FIG. 10 illustrates an example of a method 1000 for configuring paging of a client node by a network node, according to an example embodiment.

At 1001, the method may comprise transmitting, to a client node, paging configuration information comprising an indication of at least one first paging parameter for monitoring a paging channel of a second network.

At 1002, the method may comprise transmitting, to the second network, paging configuration information comprising at least one second paging parameter for transmitting a paging message associated with a first network to the client node.

At 1003, the method may comprise receiving a paging response from the client node.

FIG. 11 illustrates an example of a method 1100 for paging a client node by a network node of behalf of another network node, according to an example embodiment.

At 1101, the method may comprise receiving, from a first network, paging configuration information comprising at least one paging parameter for transmitting a paging message associated with the first network to a client node from a second network.

At 1102, the method may comprise transmitting, to the client node, the paging message associated with the first network based on the at least one paging parameter.

Further features of the methods directly result for example from functionalities of the client node such as UE 110, or the network node(s) such as the eNB 120 or gNB 130, as described throughout the specification and in the appended claims, and are therefore not repeated here. Different variations of the methods may be also applied, as described in connection with the various example embodiments.

An apparatus, for example a client node such as UE 110, or a network node such as eNB 120 or gNB 130 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and at least one memory including program code, the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:

at least one processor; and at least one memory including computer program code;

the at least one memory and the computer code configured to, with the at least one processor, cause the apparatus at least to:

receive, from a first network, paging configuration information comprising an indication of at least one paging parameter for monitoring a paging channel of a second network;

monitor the paging channel of the second network based on the at least one paging parameter; and in response to receiving a paging message from the paging channel of the second network, transmit a paging response to the first network;

wherein the first network comprises a fifth generation NodeB and the second network comprises an evolved NodeB of a long term evolution of narrow band internet of things network;

wherein monitoring the paging channel of the second network comprises monitoring with a radio that has a lower power consumption than a radio used to communicate with the first network, wherein the at least one memory and the computer code are further configured to, with the at least one processor, cause the apparatus to:

transmit, to the first network, an indication of a capability to receive paging messages associated with the first network from the second network.

2. The apparatus according to claim 1, wherein the at least one memory and the computer code are further configured to, with the at least one processor, cause the apparatus to:

determine whether it is stationary based on a signal strength from a serving cell of the first network being above a threshold;

in response to detecting that the signal strength falls below the threshold, perform cell reselection to the second network and initiate a tracking area update; and monitor a signal of the first network for cell reselection purposes at preconfigured or signaled time intervals, the time interval being longer than a time interval configured for monitoring a paging channel of the first network.

3. The apparatus according to claim 1, wherein the at least one paging parameter comprises at least a discontinuous reception cycle, an international mobile subscriber identity, and an inactive radio network temporary identifier.

4. The apparatus according to claim 1, wherein the paging configuration information comprises at least:

an indication of a fallback condition for transitioning to an idle mode with respect to the first network, an indication of a cell reselection condition for the first network, and an indication of a set of neighboring cells of the first network supporting paging over the second network.

5. The apparatus according to claim 4, wherein the at least one memory and the computer code are further configured to, with the at least one processor, cause the apparatus to:

perform cell reselection to a cell of the set of neighboring cells of the first network supporting paging over the second network, in response to detecting the cell reselection condition for the first network; and continue monitoring the paging channel of the second network, or initiate monitoring a second paging channel of the second network based on paging configuration information received from the reselected cell.

6. An apparatus, comprising:

at least one processor; and at least one memory including computer program code;

the at least one memory and the computer code configured to, with the at least one processor, cause the apparatus at least to:

transmit, to a client node, paging configuration information comprising an indication of at least one first paging parameter for monitoring a paging channel of a second network;

transmit, to the second network, paging configuration information comprising at least one second paging parameter for transmitting a paging message associated with a first network to the client node; and receive a paging response from the client node, wherein the first network comprises a fifth generation NodeB and the second network comprises an evolved NodeB of a long term evolution of narrow band internet of things network;

wherein monitoring the paging channel of the second network comprises monitoring with a radio that has a lower power consumption than a radio used to communicate with the first network.

7. An apparatus, comprising:

at least one processor; and at least one memory including computer program code;

the at least one memory and the computer code configured to, with the at least one processor, cause the apparatus at least to:

receive, from a first network, paging configuration information comprising at least one paging parameter for transmitting a paging message associated with the first network to a client node from a second network; and transmit, to the client node, the paging message associated with the first network based on the at least one paging parameter, wherein the first network comprises a fifth generation NodeB and the second network comprises an evolved NodeB of a long term evolution of narrow band internet of things network;

wherein monitoring the paging channel of the second network comprises monitoring with a radio that has a lower power consumption than a radio used to communicate with the first network.

8. The apparatus according to claim 6, wherein the at least one memory and the computer code are further configured to, with the at least one processor, cause the apparatus to:

receive, from the client node, an indication of a capability to receive paging messages associated with the first network from the second network; and transmit the at least one second paging configuration message to the second network, in response to receiving the indication of the capability of the client node to receive paging messages associated with the first network from the second network.

9. The apparatus according to claim 6, wherein the at least one first paging parameter or the at least one second paging parameter comprises at least a discontinuous reception cycle, an international mobile subscriber identity, or and an inactive radio network temporary identifier.

10. The apparatus according to claim 6, wherein the at least one first paging configuration message comprises at least-one of:

an indication of a cell reselection condition for the first network, an indication of a set of neighboring cells of the first network supporting paging over the second network, and an indication of a fallback condition for transitioning to an idle mode with respect to the first network.

11. The apparatus according to claim 6, wherein the at least one first paging configuration message or the at least one second paging configuration message comprises at least one paging response parameter.

12. The apparatus according to claim 6, wherein the at least one first paging configuration message comprises a radio resource control connection release message.

13. The apparatus according to claim 6, wherein the at least one memory and the computer code are further configured to, with the at least one processor, cause the apparatus to: transmit, to the client node, an indication of a time-frequency location of at least one common channel of the second network, a time-frequency location of at least one common signal of the second network, or timing information of the second network.

14. The apparatus according to claim 7, wherein the at least one paging parameter comprises at least a discontinuous reception cycle, an international mobile subscriber identity, and an inactive radio network temporary identifier.

15. The apparatus according to claim 7, wherein the paging message comprises at least one paging response parameter.

16. The apparatus according to claim 7, wherein a type of the paging message indicates use of an identifier associated with the first network in the paging message.

17. The apparatus according to claim 7, wherein the at least one memory and the computer code are further configured to, with the at least one processor, cause the apparatus to:

transmit, to the client node, control information comprising at least one of an indication of a paging subframe offset relative to a paging occasion configured for the second network, an indication of a paging radio network temporary identifier, an identifier of a wake-up signal sequence, or an indication of a temporal location of the wake-up signal.

* * * * *